US012220938B2

(12) United States Patent
Boura

(10) Patent No.: US 12,220,938 B2
(45) Date of Patent: Feb. 11, 2025

(54) BALL POINT TIP AND WRITING INSTRUMENT FITTED WITH SUCH A BALL POINT TIP

(71) Applicant: SOCIETE BIC, Clichy (FR)

(72) Inventor: Jean-Baptiste Boura, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 75 days.

(21) Appl. No.: 17/600,783

(22) PCT Filed: Apr. 10, 2020

(86) PCT No.: PCT/EP2020/060305
§ 371 (c)(1),
(2) Date: Oct. 1, 2021

(87) PCT Pub. No.: WO2020/208221
PCT Pub. Date: Oct. 15, 2020

(65) Prior Publication Data
US 2022/0194119 A1 Jun. 23, 2022

(30) Foreign Application Priority Data
Apr. 10, 2019 (EP) .................................... 19305466

(51) Int. Cl.
*B43K 1/08* (2006.01)
*B43K 7/10* (2006.01)
*B43K 15/00* (2006.01)

(52) U.S. Cl.
CPC ................ *B43K 1/086* (2013.01); *B43K 7/10* (2013.01); *B43K 15/00* (2013.01)

(58) Field of Classification Search
CPC ................................ B43K 1/086; B43K 7/10
(Continued)

(56) References Cited

U.S. PATENT DOCUMENTS 2,258,841 A * 10/1941 Laszlo .................... B43K 1/08 401/214
2,444,003 A 6/1948 Chesler
(Continued)

FOREIGN PATENT DOCUMENTS

EP 0331843 A1 * 9/1989
JP S5563782 U 5/1980
(Continued)

OTHER PUBLICATIONS

International Search Report and Written Opinion in International Application No. PCT/EP2020/060305, mailed Jun. 9, 2020 (10 pages).
(Continued)

*Primary Examiner* — David P Angwin
*Assistant Examiner* — Bradley S Oliver
(74) *Attorney, Agent, or Firm* — Bookoff McAndrews, PLLC

(57) ABSTRACT

A ball point tip comprising a ball holder having an ink conduit and a ball house, a ball accommodated into the ball house and a leaf spring axially disposed between the ball and an axial end of the ink conduit, the leaf spring having a main body and a plurality of tongues extending radially from the main body, ink passages being formed between the tongues in order to fluidly connect the ink conduit and the ball house, wherein the ball holder and the leaf spring are made of plastic and unitary formed.

20 Claims, 8 Drawing Sheets

(58) Field of Classification Search
USPC .................................................. 401/214, 216
See application file for complete search history.

(56) References Cited

U.S. PATENT DOCUMENTS

| | | | | |
|---|---|---|---|---|
| 5,957,609 | A | 9/1999 | Morita et al. | |
| 6,161,977 | A | 12/2000 | Furukawa | |
| 2012/0034017 | A1 * | 2/2012 | Archer .................. | A61K 8/922 401/214 |

FOREIGN PATENT DOCUMENTS

| | | | | |
|---|---|---|---|---|
| JP | H09202086 | A | | 8/1997 |
| JP | 2011056670 | A | * | 3/2011 |
| WO | 8908563 | A1 | | 9/1989 |
| WO | 03093026 | A2 | | 11/2003 |

OTHER PUBLICATIONS

Extended European Search Report in European Patent Application No. 19305466.5, dated Oct. 4, 2019 (10 pages).

* cited by examiner

BALL POINT TIP AND WRITING INSTRUMENT FITTED WITH SUCH A BALL POINT TIP

CROSS REFERENCE TO RELATED APPLICATIONS

This application is a National Stage Application of International Application No. PCT/EP2020/060305, filed on Apr. 10, 2020, now published as WO2020208221A1 and which claims priority from EP19305466.5, filed on Apr. 10, 2019, the entire contents of which are incorporated herein by reference.

TECHNICAL FIELD

The present disclosure relates to a ball point tip, a method for manufacturing such a ball point tip, and a writing instrument fitted with such a ball point tip.

BACKGROUND

Typically, a problem of ink leakage and writing smoothness may occur in ball point tips, in particular when gel ink is used. Therefore, a need exists to prevent the occurrence of ink leakage and improve writing smoothness.

SUMMARY

An embodiment relates to a ball point tip comprising a ball holder having an ink conduit and a ball house, the ink conduit extending axially and opening into the ball house, a ball accommodated into the ball house and a leaf spring axially disposed between the ball and an axial end of the ink conduit, the leaf spring having a main body and a plurality of tongues extending radially from the main body, ink passages being formed between the tongues in order to fluidly connect the ink conduit and the ball house.

The ball holder may form a tip body. The ink conduit may comprise a first axial end configured to receive ink from an ink reservoir and a second axial end, opposite along the axial direction to the first axial end, opening into the ball house. The ball house is a portion of the ball holder which is distinct from the ink conduit. Considered in the axial direction, the ink conduit and the ball house may be adjacent. The ball house comprises a first axial end configured to receive ink from the ink conduit and a second axial end, opposite along the axial direction to the first axial end, from which the ball protrudes in order to write. The leaf spring may be placed between the ball and the second axial end of the ink conduit. Ink passages may be formed between the tongues and the walls of the ball holder. Such passages may allow fluid connection between the ink conduit and the ball house, in order to feed the ball house with ink.

The leaf spring may comprise at least two tongues. In other words, the leaf spring may comprise two tongues, or more than two tongues. For example, a beam or a regular rectangular plate may be considered as a leaf spring having a central portion as a main body, and two end portions as two tongues.

Considered in the axial direction, the ball may cooperate on one side with the leaf spring, and on the other side, opposite to the one side along the axial direction, with a lip or the like of the ball house, such a lip or the like being configured to block the ball inside the ball house. For example, the leaf spring may be pre-stressed (i.e. the ball bears against the leaf spring). For example, the ball may axially deform the leaf spring up to 0.05 mm (five hundredths of a millimetre).

The leaf spring may tend to press the ball toward the tip (e.g. the retaining lip of the ball house), which may allow for a tight fit between the ball and the tip. In addition, the ball cooperates with the leaf spring on a single contact point. Such a punctual contact between the ball and the leaf spring improves the tribological aspects and reduces wear. Indeed, reducing the contact surface may reduce friction. As a result, writing smoothness is improved.

In some embodiments, the main body may be the centre of the leaf spring, the tongues extending radially and outwardly (i.e. radially outward) from the main body.

The ball thus cooperates with the central portion while the distal ends of the tongues cooperate with a wall of the ball holder. Such a configuration ensures a single punctual contact between the ball and the leaf spring, which improves the tribological aspects and reduce wear. As a result, writing smoothness is improved.

In some embodiments, the main body (or the central portion) may be solid and the total flow cross section of the ink passages may be greater or equal to 0.01 $mm^2$ (one hundredth of a millimetre square) and lower or equal to 0.09 $mm^2$ (nine hundredths of a millimetre square), for example greater or equal to 0.01 $mm^2$ (one hundredth of a millimetre square) and lower or equal to 0.08 $mm^2$ (height hundredths of a millimetre square).

In other word, the main body may not show any thought holes through which ink may flow. The total flow cross section may correspond to the sum of the flow cross section of all the ink passages. Such cross sections may be perpendicular to an axis of the ball point tip. Such ranges may help to adjust the ink laydown (i.e. ink flow flowing from the ball during writing).

In some embodiments, the distal end of each tongue may be enlarged when viewed from the axial direction.

The width in a radial direction (i.e. in a direction perpendicular to the axial direction) of each tongue increases from the proximal end (the end which is linked to the main body) toward the distal end. In other words, the tongues are larger at their distal ends than they are at their proximal end. Such a configuration improves the mechanical strength of the tongues, which helps reduce the occurrence of ink leakage and enhances writing smoothness.

In some embodiments, the ball point may comprise an annular lip configured to retain the ball within the ball housing, wherein the leaf spring may be configured to be elastically deformed during writing so that a gap between the ball and the annular lip may be greater or equal to 0.002 mm (two thousandths of a millimetre) and lower or equal to 0.2 mm (two tenths of a millimetre).

During writing, the pressure exerted onto the ball may elastically deform the leaf spring (i.e. in normal use, the deformation of the leaf spring remains in its elastic domain while no plastic deformation occurs). In other words, when not used, the leaf spring remains in its rest shape/position. The gap may correspond to the smallest distance between the lip and the ball. Such a range may help to adjust the ink laydown.

In some embodiments, the leaf spring may be pre-stressed.

In some embodiments, the ball point may have an axis, wherein the ball may exert the pre-stress to the leaf spring (i.e. the ball may bear against the leaf spring), and the leaf spring may have an axial deformation which is greater or equal to 0.01 mm (one hundredth of a millimetre) and lower or equal to 0.2 mm (two tenths of a millimetre) due to the pre-stress exerted by the ball.

This range may help to obtain different static pressure onto the ball in order to better control ink laydown during writing and prevent leakage when not used.

In some embodiments, a stop may be arranged in the ball house, the stop may be configured to limit movements of the ball within the ball house with regard to the leaf spring.

Such a stop may help to prevent the leaf spring from being damaged by the ball (for example during writing or when a choc occurs onto the ball).

In some embodiments, the stop may be annular and may comprise a stop face, the stop face may have a frustoconical shape or a spherical shape.

The ball point tip may have an axis, and the stop may extend annularly (continuously or discontinuously) around the axis. A frustoconical shape may lead to a ring contact (or portions of a ring contact) between the ball and the stop that may reduce the friction and then increase the writing smoothness. A spherical shape may lead to a spherical contact (or portions of a sphere contact) between the ball and the stop that may increase the guidance of the ball and increase the writing cleanliness.

In some embodiments, the ball holder may comprise a shoulder formed between the ink conduit and the ball house, the leaf spring may be disposed between the shoulder and the ball.

For example, the shoulder may comprise a radial face, i.e. a face perpendicular to the axial direction. The leaf spring may bear axially against the shoulder, the ball pushing or tending to push the leaf spring against the shoulder. Such a configuration is efficient and reliable, which reduces the occurrence of ink leakage and enhances writing smoothness.

In some embodiments, the leaf spring may be made of metal and/or plastic (or polymeric material).

In the present disclosure, what is meant by a "plastic" or "polymeric material" is a synthetic organic polymer material or a synthetic organic polymer. For example, the leaf spring may be made of plastic only, or metal only, or both of metal and plastic. For example, the leaf spring may comprise a metallic core coated with a plastic layer. According to another example, the leaf spring may comprise part(s) made of plastic and other part(s) made of metal. Such materials are well adapted to manufacture reliable leaf spring. For example, the leaf spring may be obtained by moulding, laser cutting, stamping, etc.

In some embodiments, the ball point tip may only comprise the ball holder, the ball and the leaf spring which are distinct and assembled together, the ball holder being made of metal.

In other words, the ball point tip may strictly comprise only three distinct elements, namely the ball holder, the ball, and the leaf spring. These three distinct elements may be assembled together in order to form the ball point tip. In such a case, the leaf spring may be made of metal.

In some embodiments, the ball holder and the leaf spring may be made of plastic and unitary/monolithically formed. In other words, the ball holder and the leaf spring may form together a single piece.

The ball holder may be made of plastic only. The leaf spring may be made of plastic only or may be made of plastic with a metallic inclusion (i.e. plastic over-molded with a metallic core). The ball point tip may strictly comprise only two distinct elements, namely the ball; and the ball holder and the leaf spring. These two distinct elements may be assembled together in order to form the ball point tip. In such a case, the leaf spring may be made of plastic.

An embodiment relates to a writing instrument comprising a ball point tip according to any one of the embodiments of the present disclosure and a reservoir configured to feed the ball point tip with ink, the reservoir comprising gel ink.

Inks for typical ball points have a viscosity lying between 14000 cPo (fourteen thousands of centipoise) and 18000 cPo (heighten of centipoise). Gel inks have a viscosity lying between 300 cPo (three hundred centipoise) and 1000 cPo (one thousand centipoise).

An embodiment relates to a method for manufacturing a ball point tip comprising the steps of providing a metallic ball holder having a ink conduit and a ball house, the ink conduit extending axially and opening into the ball house, a shoulder being formed between the ink conduit and the ball house; arranging a ball and a leaf spring having a main body and a plurality of tongues extending radially from the main body into the ball house such that the leaf spring is disposed between the ball and the shoulder and such that ink passages are formed between the tongues of the leaf spring in order to provide fluid connection between the ink conduit and the ball house; and crimping the ball to the ball holder.

In some embodiments, before providing the ball holder, the ball holder may be made by forming the cavity of both the ball house and the ink conduit and during a single step.

An embodiment relates to method for manufacturing a ball point tip comprising the steps of providing a ball holder made of plastic, the ball holder having a ink conduit, a ball house and a leaf spring having a main body and a plurality of tongues extending radially from the main body, the ink conduit extending axially and opening into the ball house, the leaf spring being arranged between the ball house and an axial end of the ink conduit such that ink passages are formed between tongues of the leaf spring in order to provide fluid connection between the ink conduit and the ball house; and press fitting a ball into the ball house.

In some embodiments, before providing the ball holder, the ball holder may be made together with the leaf spring by moulding and during a single step.

Such manufacturing methods are simple and cost effective. Due to the structure of the present ball point tip having only a leaf spring but no dedicated ball seat, the ball holder may be made by only moulding or by forming a cavity, which reduces the number of dedicated tools and manufacturing steps. When the leaf spring is distinct from the ball holder, it is easy to place the leaf spring and thereafter the ball into the ball house, and then crimping the ball to the ball holder. When the leaf spring is unitary formed with the ball holder, it is easy to place the ball within the ball house by press fitting.

BRIEF DESCRIPTION OF THE DRAWINGS

The disclosure and its advantages can be better understood by reading the detailed description of various embodiments of the disclosure given as non-limiting examples. The description refers to the accompanying sheets of figures, in which.

DETAILED DESCRIPTION

Figure 1:
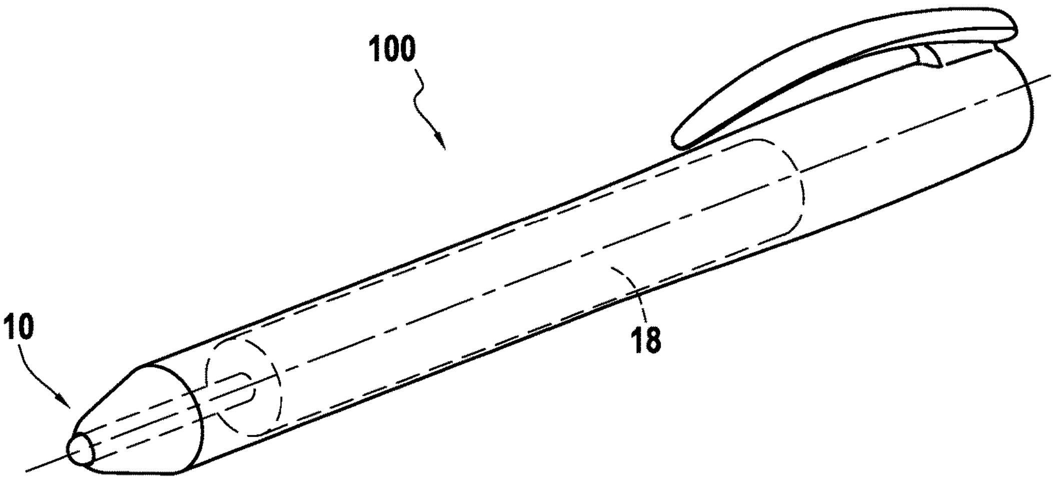
FIG. 1 shows a writing instrument having a ball point tip.
Figure 2:
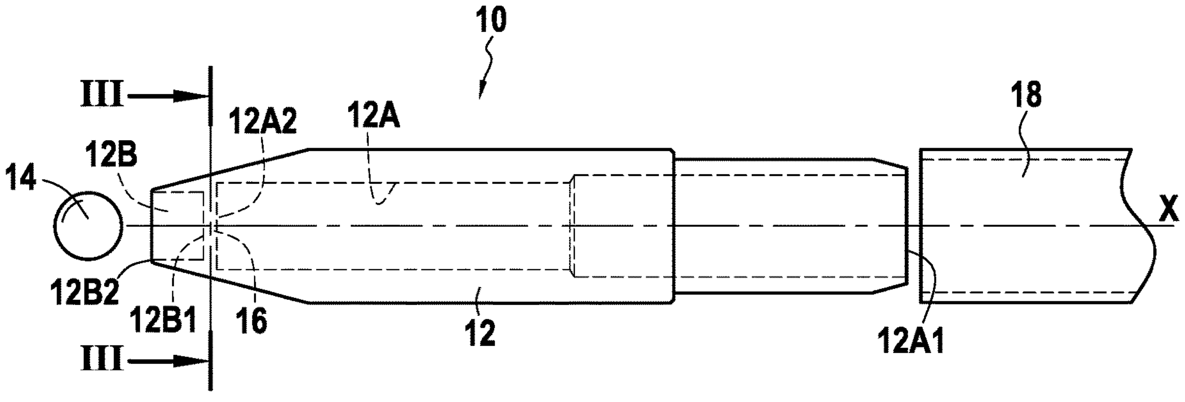
FIG. 2 shows an exploded view of the ball point tip of the writing instrument of FIG. 1 according to a first embodiment.

FIG. 1 shows a writing instrument 100 fitted with a ball point tip 10. An exploded view of the ball point tip 10 is shown FIG. 2. The ball point tip 10 has a ball holder 12, a ball 14 and a leaf spring 16. The writing instrument 100 may comprises an ink reservoir 18 configured to feed the ball point tip 10 with ink. The reservoir 18 may comprise gel ink.

The ball holder 12 comprises an ink conduit 12A and a ball house 12B. The ink conduit 12A extends along the axial direction X and may comprise a first axial end 12A1 configured to receive ink from the ink reservoir 18 and a second axial end 12A2, opposite along the axial direction X to the first axial end 12A1, opening into the ball house 12B. The ball house 12B may comprise a first axial end 12B1 configured to receive ink from the ink conduit 12A and a second axial end 1262, opposite along the axial direction X to the first axial end 1261, from which the ball 14 protrudes in order to write.

Figure 3A:
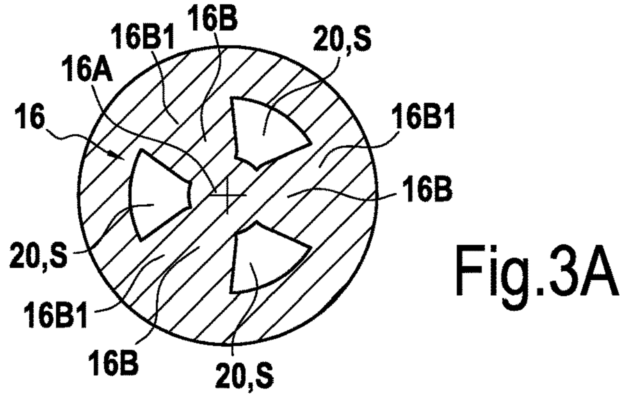
FIG. 3A shows the leaf spring in the section III of FIG. 2.

The leaf spring 16 is placed axially between the ball 14 and the second axial end 12A2 of the ink conduit 12A. FIG. 3A shows the leaf spring 16 along the cross section III of FIG. 2. The leaf spring 16 may have a main body 16A which is the centre and three tongues 16B which each extends radially and outwardly from the main body 16A. Ink passages 20 are formed between the tongues 16B in order to fluidly connect the ink conduit 12A and the ball house 12B and to feed the ball house 12B with ink flowing from the reservoir 18 throughout the ink conduit 12A. As shown in FIG. 3A, the distal end 16B1 of each tongue 16B may be enlarged when viewed from the axial direction X. In this first embodiment, the leaf spring 16 may be made of plastic as well as the ball holder 12 and unitary/monolithically formed.

Figure 3B:
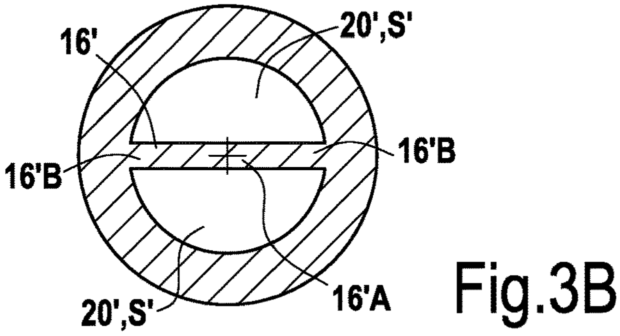
FIG. 3B shows a variant of the leaf spring of FIG. 3A.

FIG. 3B shows a leaf spring 16' according to a variant of the leaf spring 16 of first embodiment. In this example, the leaf spring 16' may have a beam shape. This leaf spring 16' may have a central portion 16'A as a main body which is the centre, and two end portions 16'B forming tongues extending radially and outwardly from the main body 16'A. Passages 20' are formed between the tongues 16'B.

Both the leaf springs 16 and 16' have a solid main body (or central portion) 16A, 16'A, respectively, i.e. without through hole. In the present example, the total flow cross section TS of the ink passages corresponds to the sum of the flow cross sections S, S' perpendicular to the axis X, of each of the passages 20, 20', respectively. In other words, for the leaf spring 16, the total flow cross section TS=3×S while for the leaf spring 16', the total flow cross section TS'=2×S'. In this example, TS=0.02 $mm^2$ and TS'=0.08 $mm^2$.

Figure 4A:
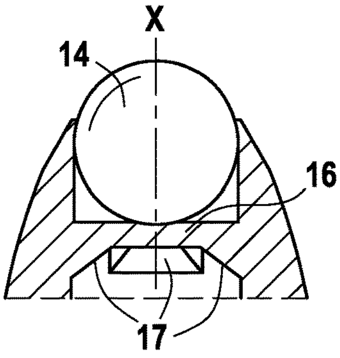
FIG. 4A shows a first variant of the ball point tip of FIG. 2.
Figure 4B:
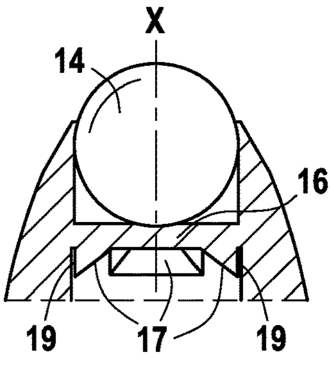
FIG. 4B shows a second variant of the ball point tip of FIG. 2.

FIG. 4A shows a first variant of the ball point tip 10 wherein each tongue 16B of the leaf spring 16 may be provided with a reinforcement 17 extending on the ink conduit side and disposed in the corner between the tongue and the ink conduit wall. The reinforcement 17 may be radially tapered from the ink conduit wall toward the axis X. In this example the reinforcement 17 may be joined to/formed with the ink conduit wall. In a second variant show in FIG. 4B, the reinforcement 17 may be distant from the ink conduit wall, i.e. a gap 19 is provided between the reinforcement 17 and the ink conduit wall. Such reinforcements strengthen the tongues 16B, which reduces the risk of ink leakage and improves writing smoothness.

Figure 5A:
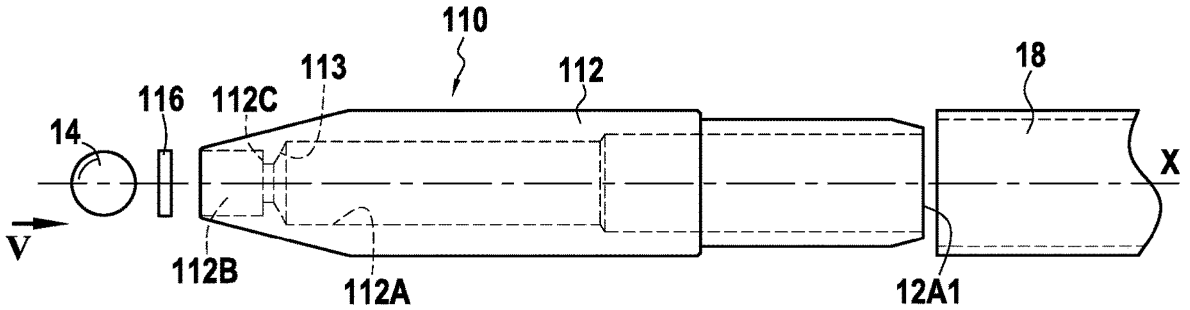
FIG. 5A shows an exploded view of a second embodiment of the ball point tip.
Figure 5B:
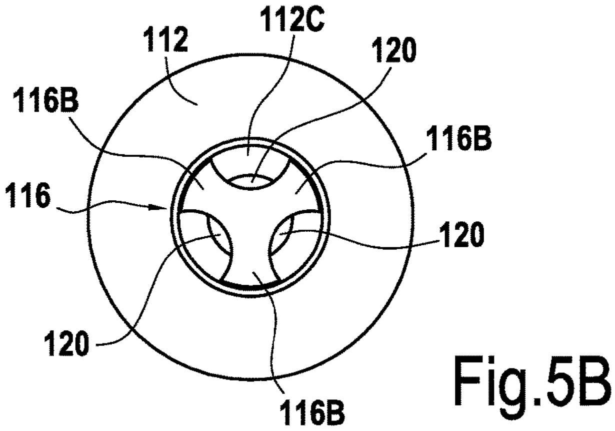
FIG. 5B shows the ink passages of the second embodiment seen from arrow V of FIG. 5B.

FIGS. 5A and 5B shows a ball point tip 110 according to a second embodiment, which may be mounted on the writing instrument 100. The ball point tip 110 has a ball holder 112, a leaf spring 116 and a ball 14. The ball holder 112 is similar to the ball holder 12 except in that it is not unitary/monolithically formed with the leaf spring 116 and in that it is provided with a shoulder 112C extending radially, the shoulder being disposed between the ink conduit 112A and the ball house 112B. In this example, the shoulder 112 may have an annular shape. An annular reinforcement filet 113 may be former axially opposite to the shoulder 112 (i.e. on the ink conduit side). Except for the above mentioned differences, the description of the ball holder 12 is the same or substantially similar to the description of the ball holder 112.

The leaf spring 116 is disposed between the shoulder 112C and the ball 14. In this example, the ball point tip 110 may comprise only the ball holder 112, the ball 14 and the leaf spring 116 which are distinct and assembled together. In this example, the ball holder 112 and the leaf spring 112 may be each made of metal.

Figure 6B:
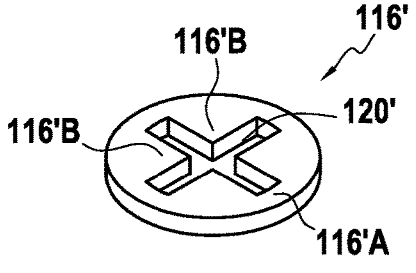
FIG. 6B shows a variant of the leaf spring of FIG. 6A, FIGS. 7A to 7D show different steps of a method for manufacturing the ball point tip of the first embodiment, FIG. 7E show a variant of FIG. 7D, FIG. 7F show the ball point of FIG. 7D during writing.
Figure 6A:
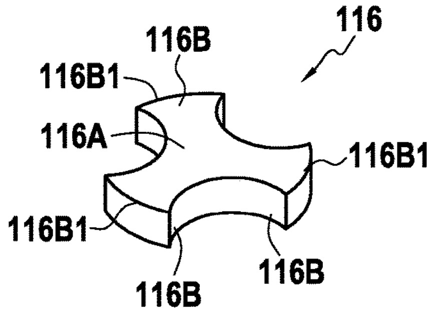
FIG. 6A shows the leaf spring of the ball point tip of FIG. 5.

The leaf spring 116 is shown in detail in FIG. 6A and may present a main body 116A as a centre and three tongues 116B extending radially and outwardly. The distal end 116B1 of each tongue 116B is enlarged when viewed from the axial direction X. In this example, the wall portion between two adjacent tongues 116B may have any suitable arcuate shape, for example an arc of circle shape.

FIG. 5B shows ink passages 120 between the tongues 116B when the leaf spring 116 is mounted into the ball holder 112, seen from the arrow V of FIG. 5A.

FIG. 6B shows a leaf spring 116' according to a variant of the leaf spring 116 of the second embodiment. In this example, the leaf spring 116' may have a disc shape with a central cut having a crux shape. This leaf spring 116' may have an outer ring portion 116'A as a main body and four tongues 116'B extending radially and inwardly from the main body 116'A. Passages 120' may be formed between the tongues 116'B.

A method for manufacturing a ball point tip having a ball holder made of plastic is now described with reference to FIGS. 7A to 7D. In this example, the ball holder is unitary/monolithically formed with a leaf spring.

Figure 7A:
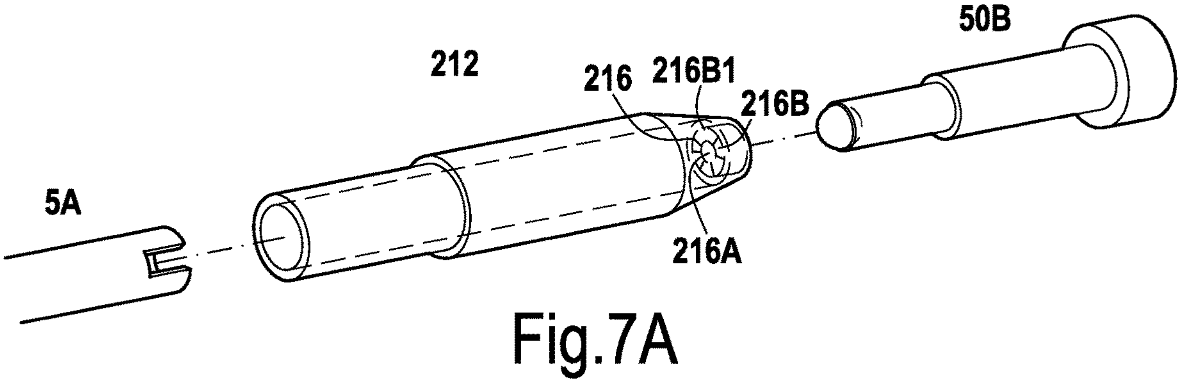

A ball holder 212 and a leaf spring 216 are made by moulding during a single step, as shown in FIG. 7A. In this example, two dedicated broaches 50A and 50B and a not shown external mould are used to carry out such a molding step. Such a step is simpler and cost effective with regard to the manufacturing of a ball holder having a dedicated ball seat. For example, a conventional method comprises one step of broaching and one step of coining which are not necessary here.

Figure 7B:
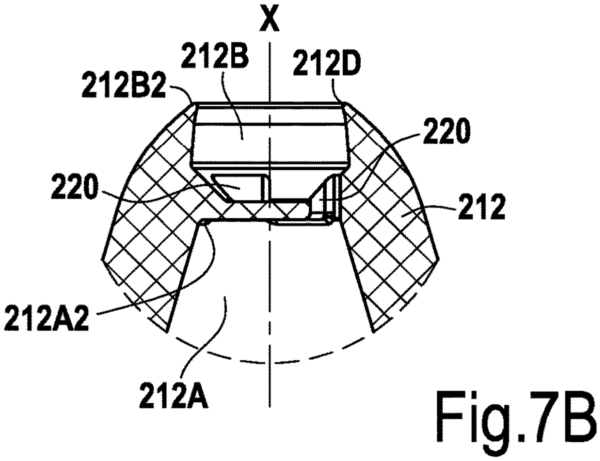

A partial and magnified cross section of the ball holder 212 and of the leaf spring 216 thus obtained is shown in FIG. 7B. The ball holder 212 has an ink conduit 212A, a ball house 212B and the leaf spring 216 having a main body 216A and a plurality of tongues 216B extending radially from the main body 216A, the ink conduit extending along the axial direction X and opening into the ball house 212B. The leaf spring 216 is arranged between the ball house 212B and the second axial end 212A2 of the ink conduit 212A such that ink passages 220 are formed between tongues 216B of the leaf spring 216 in order to provide fluid connection between the ink conduit 212A and the ball house 212B. The distal end 216B1 of each tongue 216B may be enlarged when viewed from the axial direction. The second axial end 212B2 of the ball house 212B may be provided with an annular lip 212D configured to block a ball inside the ball house 212. In this example, the ball holder 212 may comprise a stop 213 arranged in the ball house 212B, in order to limit the movements, for example the axial movements, of the ball 14 within the ball house 212B. Such a stop 213 may prevent the leaf spring 216 from being damaged by the ball 14. The stop 213 may be disposed in the corner between the leaf spring 216 and the ball house wall. The stop 213 may be radially tapered from the ball house wall toward the axis X. The stop 213 may extend annularly around the axis X. The stop 213 may extend continuously around the axis X, and show only through holes corresponding to the passages 220. The stop 213 has a stop face 213A having a frustoconical shape. In a variant shown in FIG. 7E, the stop face 213A' of the stop 213' has a spherical shape. The radius of spherical stop face 213A' may be greater or equal to the radius of the ball 14.

The ball holder 212 differs from the ball holder 12 only in that it shows a stop 213 which is not present on the ball holder 12. In a variant not shown, the ball holder 12 may be provided with the stop 213 or 213'. In the same way, the ball holder 212 may be provided with the optional reinforcement 17, with or without the gap 19. The leaf spring 216 may have a shape of a beam, as the leaf spring 16', instead of a similar shape as the leaf spring 16.

Figure 7C:
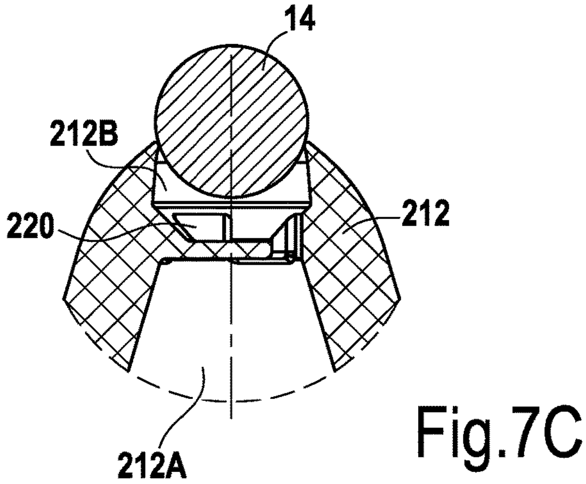
Figure 7D:
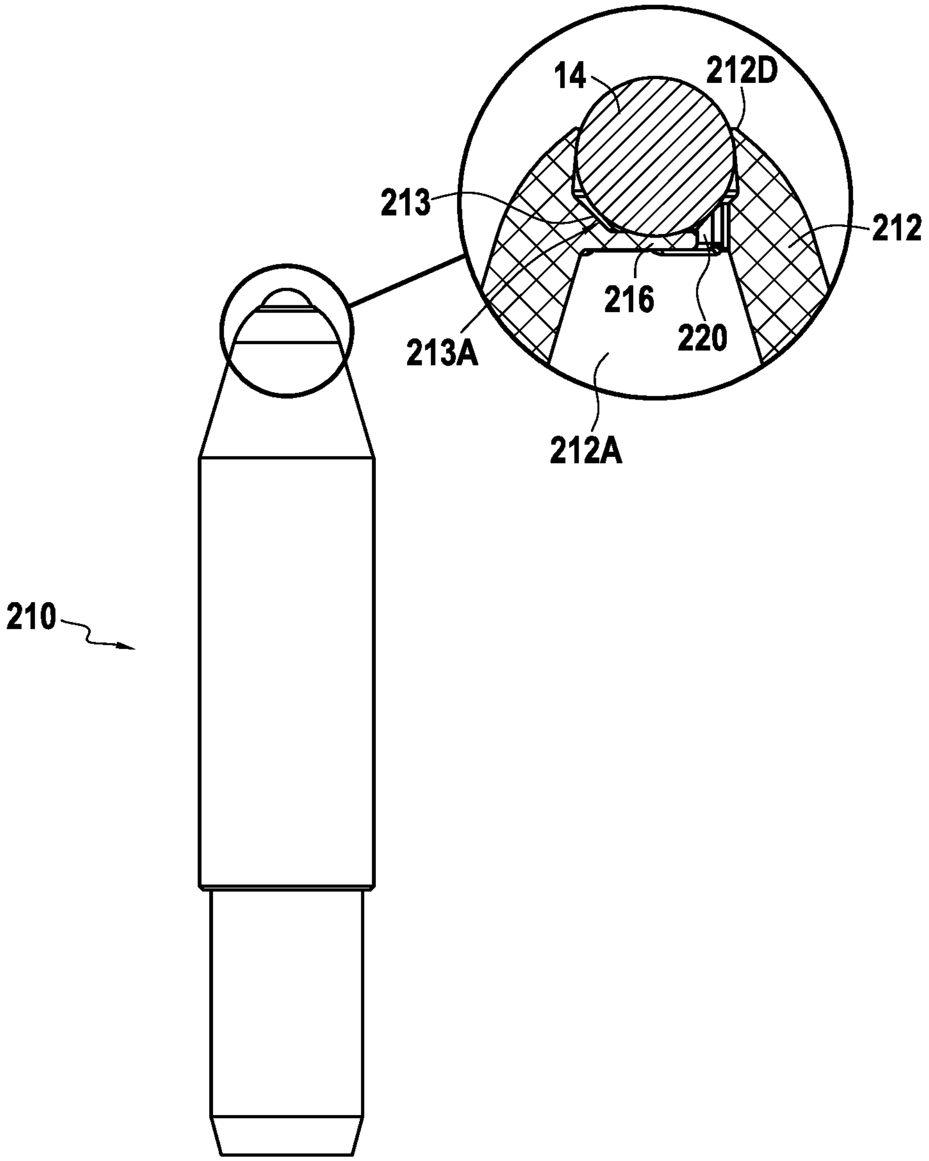
Figure 7E:
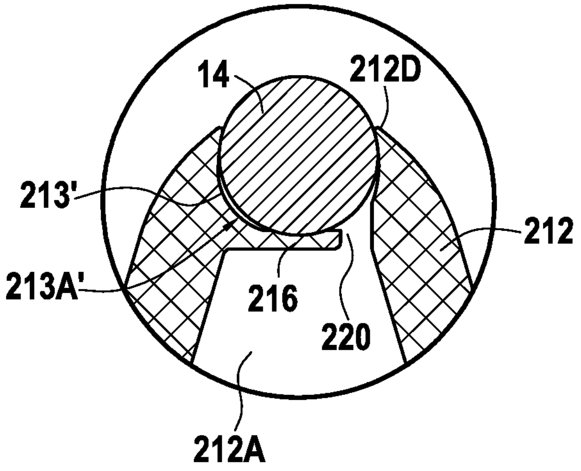

As shown in FIG. 7C, a ball 14 may be press fitted into the ball house 212B. As shown in FIG. 7D, a ball point tip 210 is thus obtained, the lip 212D retaining the ball 14 within the ball house 212B. In this example, the leaf spring 216 may be pre-stressed and axially deformed of about 0.02 mm (two hundredths of a millimetre). The ball 14 may be configured to pre-stress the leaf spring 216 when mounted and blocked by the lip 212D. The leaf spring 216 may be pre-stressed by the ball 14 which may axially bear against the leaf spring 216. Such a pre-stress may provide a "valve effect" between the ball 14 and the lip 212D.

Figure 7F:
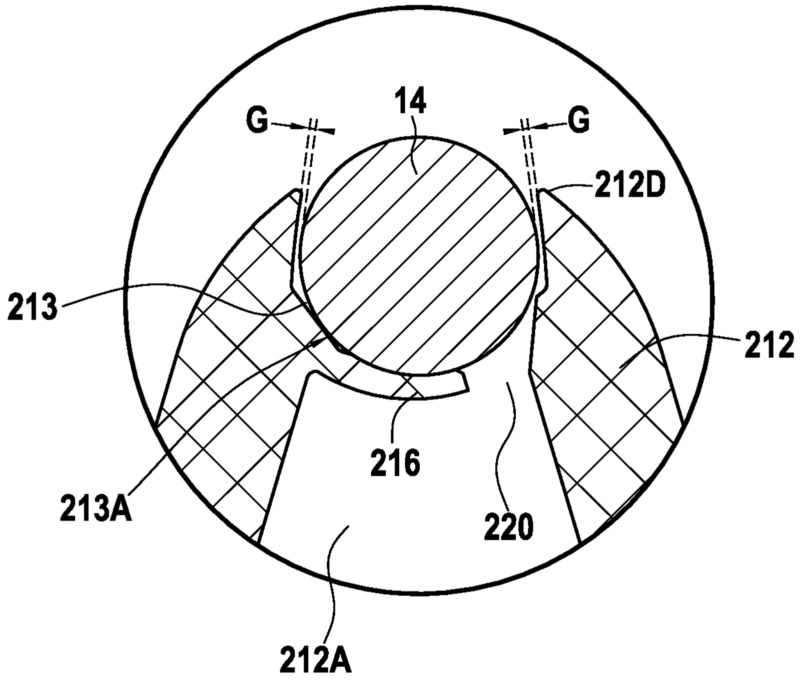

As shown in FIG. 7F, the leaf spring may be configured to be elastically deformed during writing so that a gap G between the ball 14 and the annular lip 212D is about 0.1 mm (one tenth of millimetre). During such deformation, the ball 14 may abut against the stop 213 or 213'. In a variant, the leaf spring 216 may be further elastically deformed before the ball 14 abuts against the stop 213, 213'. In such a case, the gap G may be increased of about 10% when the ball 14 bears against the stop 213 or 213'. The total elastic deformation of the leaf spring 216 may remain within a range of 0.002 m to 0.2 mm. The deformation of the leaf spring 213 show in FIG. 7F is magnified and schematic.

Such a manufacturing method may apply, for example, for manufacturing ball point tips of the first embodiment and its variants of FIGS. 1 to 4B. In other words, any features disclosed with regard to the embodiments disclosed with reference to FIGS. 1 to 4B may apply, alone or in any combination, to the embodiment of FIGS. 7A to 7E, and vice versa, any features disclosed with regard to the embodiments disclosed with reference to FIGS. 7A to 7E may apply, alone or in any combination, to the embodiment of FIGS. 1 to 4B.

A method for manufacturing a ball point tip having a ball holder made of metal is now described with reference to FIGS. 8A to 8D.

Figure 8A:
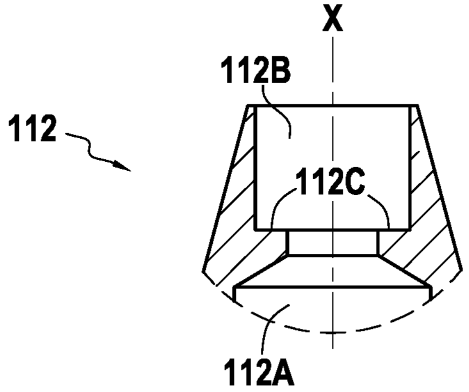
FIGS. 8A to 8D show different steps of a method for manufacturing the ball point tip of the second embodiment.

A metallic ball holder 112 is provided, this ball holder 112 having, as shown the partial and magnified cross section of FIG. 8A, an ink conduit 112A and a ball house 112B. The ink conduit 112A extending along the axial direction X and opening into the ball house 112B, and a shoulder 112C being formed between the ink conduit 112A and the ball house 112B. In this example the axial walls of the ball house 112B may be straight and may not show any lip or the like. Such a metallic ball holder may be made by forming the cavity of both the ball house and the ink conduit during a single step.

Figure 8B:
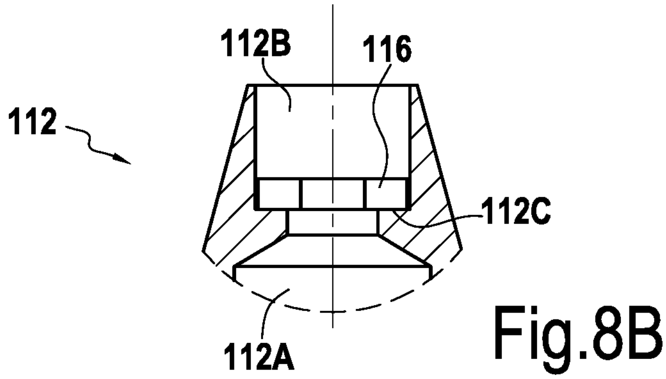
Figure 8C:
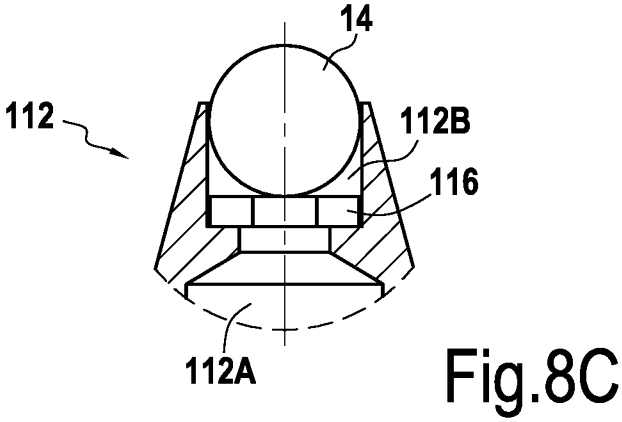
Figure 8D:
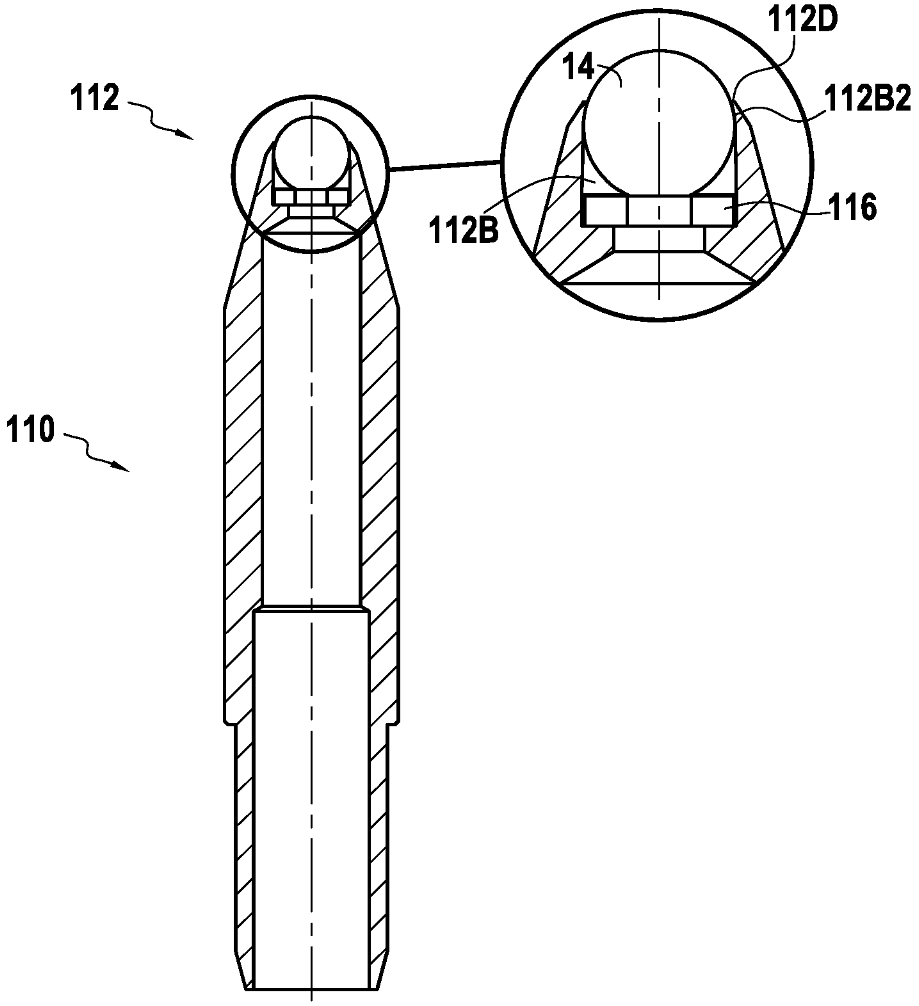

In a second step, as shown in FIG. 8B, a leaf spring 116 is provided and placed within the ball house 112B, onto the shoulder 112C. In a third step, as shown in FIG. 8C, a ball 14 is provided within the ball house 112B, onto the leaf spring 116. The leaf spring 116 is thus disposed between the ball 14 and the shoulder 112C such that ink passages 120 are formed (see FIG. 5B) between the tongues 116B of the leaf spring 116 in order to provide fluid connection between the ink conduit 112A and the ball house 112B. Then, the ball 14 is crimped on the ball holder 112. In this example, the second axial end 11262 of the ball house 112B is machined in order to form a lip 112B which retains the ball 14 into the ball house 112B. The ball point tip 110 is thus obtained is shown in FIG. 8D.

Although the present disclosure is described with reference to specific examples, it is clear that modifications and changes may be made to these examples without going beyond the general scope of the disclosure as defined by the claims. In particular, individual characteristics of the various embodiments shown and/or mentioned may be combined in additional embodiments. Consequently, the description and the drawings should be considered in a sense that is illustrative rather than restrictive.

For example, the leaf springs shown have two, three or four tongues, but may have more than four tongues.

Additionally, all of the disclosed features of an apparatus may be transposed, alone or in combination, to a method and vice versa.

The invention claimed is:

1. A ball point tip comprising:

a ball holder having an ink conduit and a ball house, the ink conduit extending axially and comprising a first axial end, a second axial end, and opening into the ball house, the ball house including a stop, and a ball accommodated into the ball house, a leaf spring axially disposed between the ball and the second axial end of the ink conduit, the leaf spring having a main body and a plurality of tongues extending radially from the main body, ink passages being formed between the plurality of tongues in order to fluidly connect the ink conduit and the ball house;

a shoulder axially disposed between the first axial end of the ink conduit and the leaf spring; and an annular reinforcement filet is axially disposed between the first axial end of the ink conduit and the shoulder, wherein the stop has a frustoconical shape and is disposed radially between a wall of the ball house and the leaf spring, wherein the ball holder and the leaf spring are made of plastic and form together a single piece.

2. The ball point tip according to claim 1, wherein the main body is the center of the leaf spring and the plurality of tongues extending radially and outwardly from the main body and wherein a reinforcement extending from the wall of the ink conduit, along the plurality of tongues, to the main body of the leaf spring, wherein the reinforcement tapers radially-inwardly toward a central longitudinal axis that is co-axial with the main body of the leaf spring, in a direction from the first axial end toward the second axial end.

3. The ball point tip according to claim 2, wherein a distal end of each tongue is larger at a radial end than at an interface with the main body.

4. The ball point tip according to claim 2, wherein the ball house includes a cylindrical wall and the stop tapers radially-inwardly in a direction from the second axial end toward the first axial end, and wherein the stop is configured to limit movements of the ball within the ball house with regard to the leaf spring.

5. The ball point tip according to claim 4, wherein the stop is annular and comprises a stop face.

6. The ball point tip according to claim 1, wherein the main body is solid, and a total flow cross section of the ink passages is greater or equal to 0.01 $mm^2$ and lower or equal to 0.09 $mm^2$.

7. The ball point tip according to claim 1, comprising an annular lip configured to retain the ball within the ball holder, wherein the leaf spring is configured to be elastically deformed during writing so that a gap between the ball and the annular lip is greater or equal to 0.002 mm and lower or equal to 0.2 mm.

8. The ball point tip according to claim 1, wherein the leaf spring is pre-stressed.

9. The ball point tip according to claim 8, having an axis, wherein the ball exerts the pre-stress to the leaf spring, the leaf spring having an axial deformation which is greater or equal to 0.01 mm and lower or equal to 0.2 mm due to the pre-stress exerted by the ball.

10. A writing instrument comprising a ball point tip according to claim 1 and a reservoir configured to feed the ball point tip with ink, the reservoir comprising gel ink.

11. The ball point tip according to claim 1, wherein the main body is solid, a total flow cross section of the ink passages is greater or equal to 0.01 $mm^2$ and lower or equal to 0.08 $mm^2$.

12. The ball point tip according to claim 1, further comprising a reinforcement extending into the ink conduit from the leaf spring, the reinforcement being disposed between an individual tongue and a wall of the ink conduit.

13. The ball point tip according to claim 12, wherein the reinforcement is radially tapered from the wall of the ink conduit toward an x-axis.

14. The ball point tip according to claim 12, wherein the reinforcement is formed into the wall of the ink conduit.

15. The ball point tip according to claim 12, wherein the reinforcement is distant from the wall of the ink conduit.

16. A ball point tip comprising:

a ball holder having an ink conduit and a ball house, the ink conduit defined by a wall and extending axially, comprising a first axial end and a second axial end, and opening into the ball house;

a ball accommodated into the ball house;

a leaf spring axially disposed between the ball and the second axial end of the ink conduit, the leaf spring having a main body and a plurality of tongues extending radially from the main body, ink passages being formed between the plurality of tongues in order to fluidly connect the ink conduit and the ball house;

a reinforcement extending from the wall of the ink conduit, along the plurality of tongues, to the main body of the leaf spring, wherein the reinforcement tapers radially-inwardly toward a central longitudinal axis that is co-axial with the main body of the leaf spring, in a direction from the first axial end toward the second axial end;

a shoulder axially disposed between the first axial end of the ink conduit and the leaf spring;

an annular reinforcement filet is axially disposed between the first axial end of the ink conduit and the shoulder, wherein the ball holder and the leaf spring are made of plastic and form together a single piece.

17. The ball point tip according to claim 16, wherein the reinforcement is radially tapered from the wall of the ink conduit toward an x-axis.

18. The ball point tip according to claim 16, wherein the reinforcement is formed into the wall of the ink conduit.

19. The ball point tip according to claim 16, wherein the reinforcement is distant from the wall of the ink conduit, and wherein the ball house includes a cylindrical wall and a stop that radially extends from the cylindrical wall to the leaf spring.

20. A writing instrument comprising:

a ball point tip comprising a ball holder having an ink conduit and a ball house, the ink conduit extending axially and comprising a first axial end and a second axial end, wherein the ink conduit opens into the ball house, the ball house including a cylindrical wall and a stop that is formed of a frustoconical shape that tapers radially-inwardly in a direction from the second axial end toward the first axial end, and a ball accommodated inside the ball house;

a leaf spring having a main body and a plurality of tongues in order to fluidly connect the ink conduit and the ball house; and a reservoir configured to feed the ball point tip with ink, the reservoir comprising gel ink;

a shoulder axially disposed between the first axial end of the ink conduit and the leaf spring; and an annular reinforcement filet axially disposed between the first axial end of the ink conduit and the shoulder, wherein the ball holder and the leaf spring are made of plastic and form together a single piece.

* * * * *